UNITED STATES PATENT OFFICE.

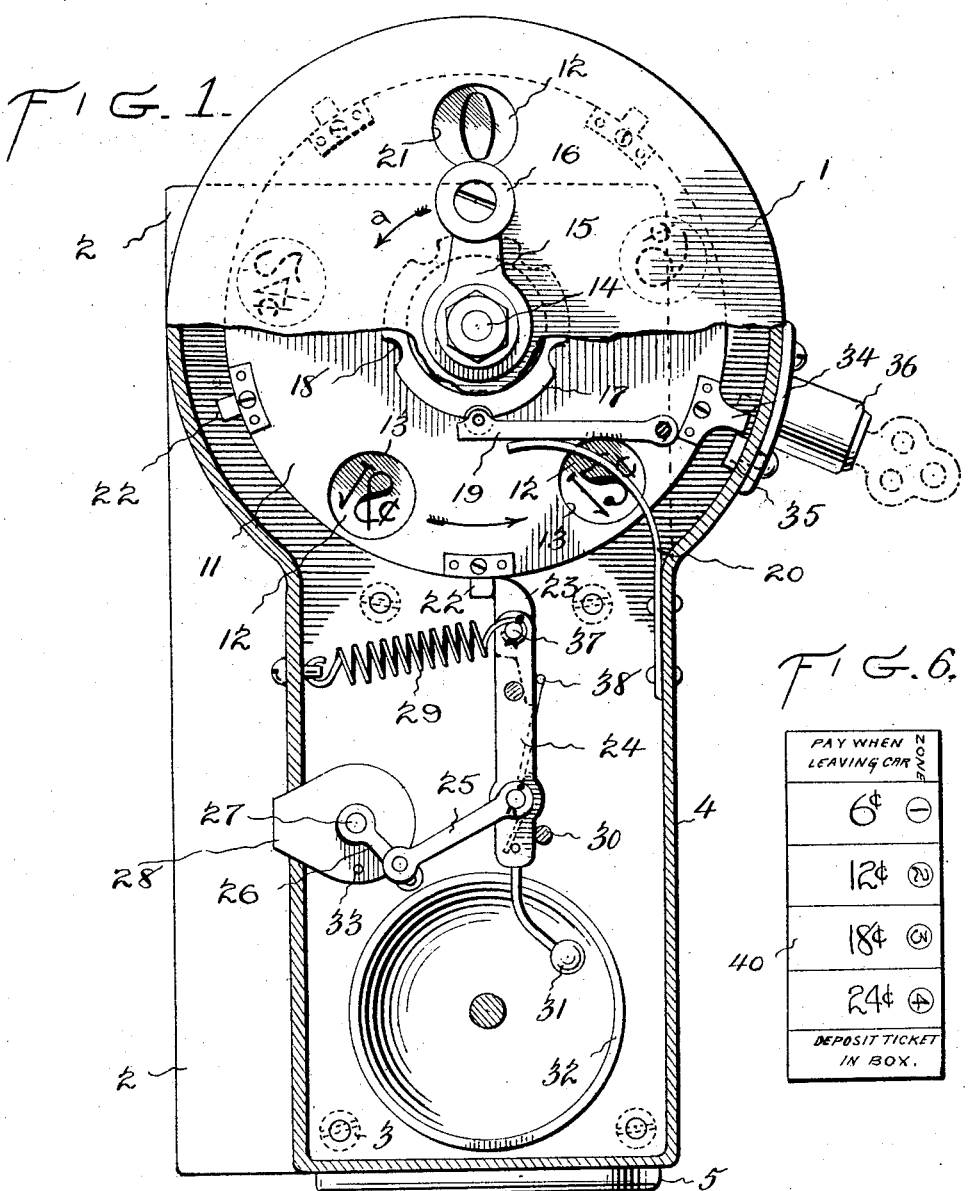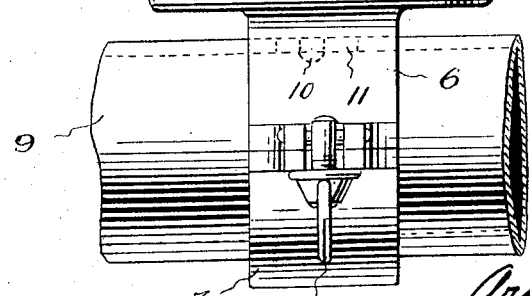

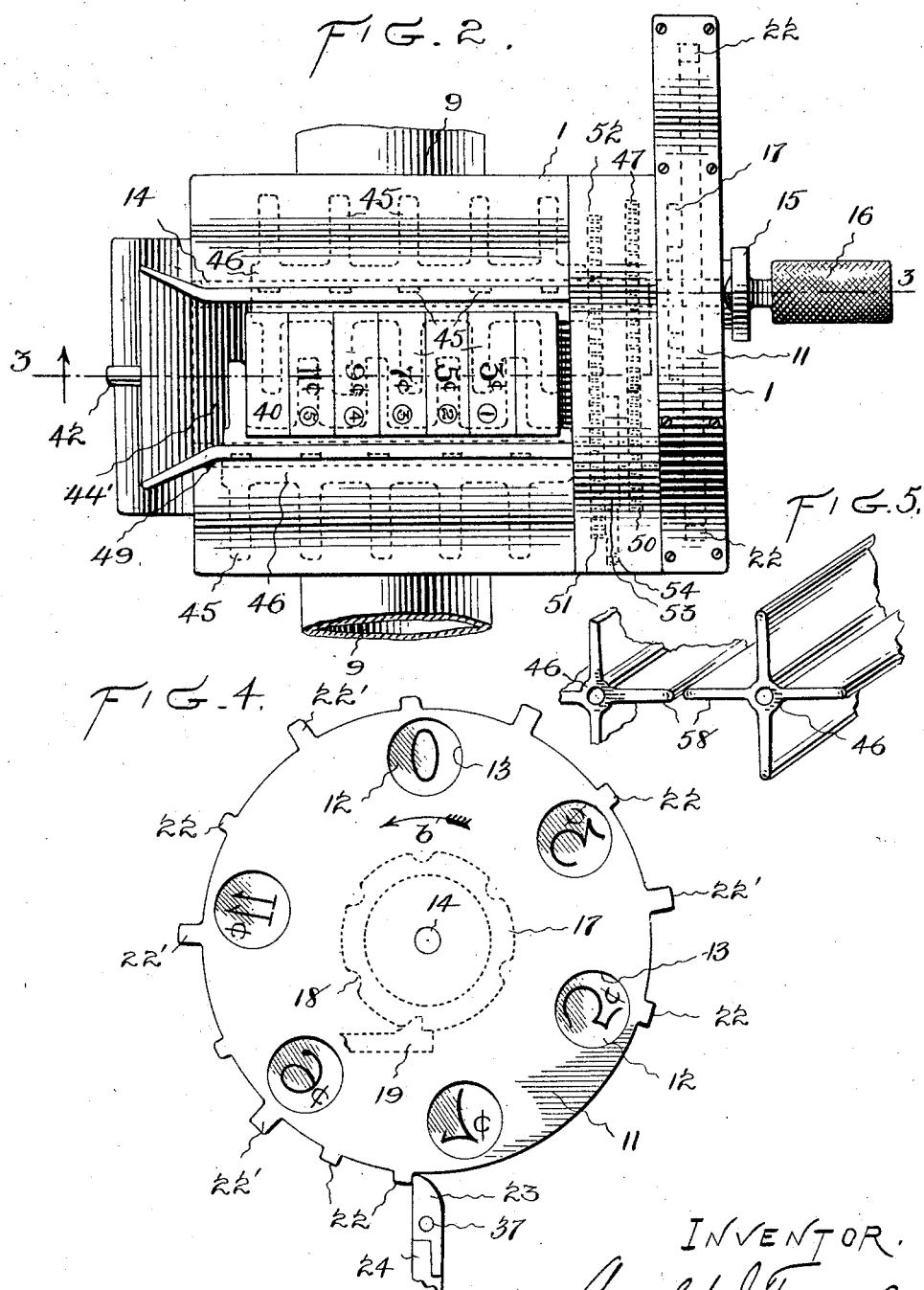

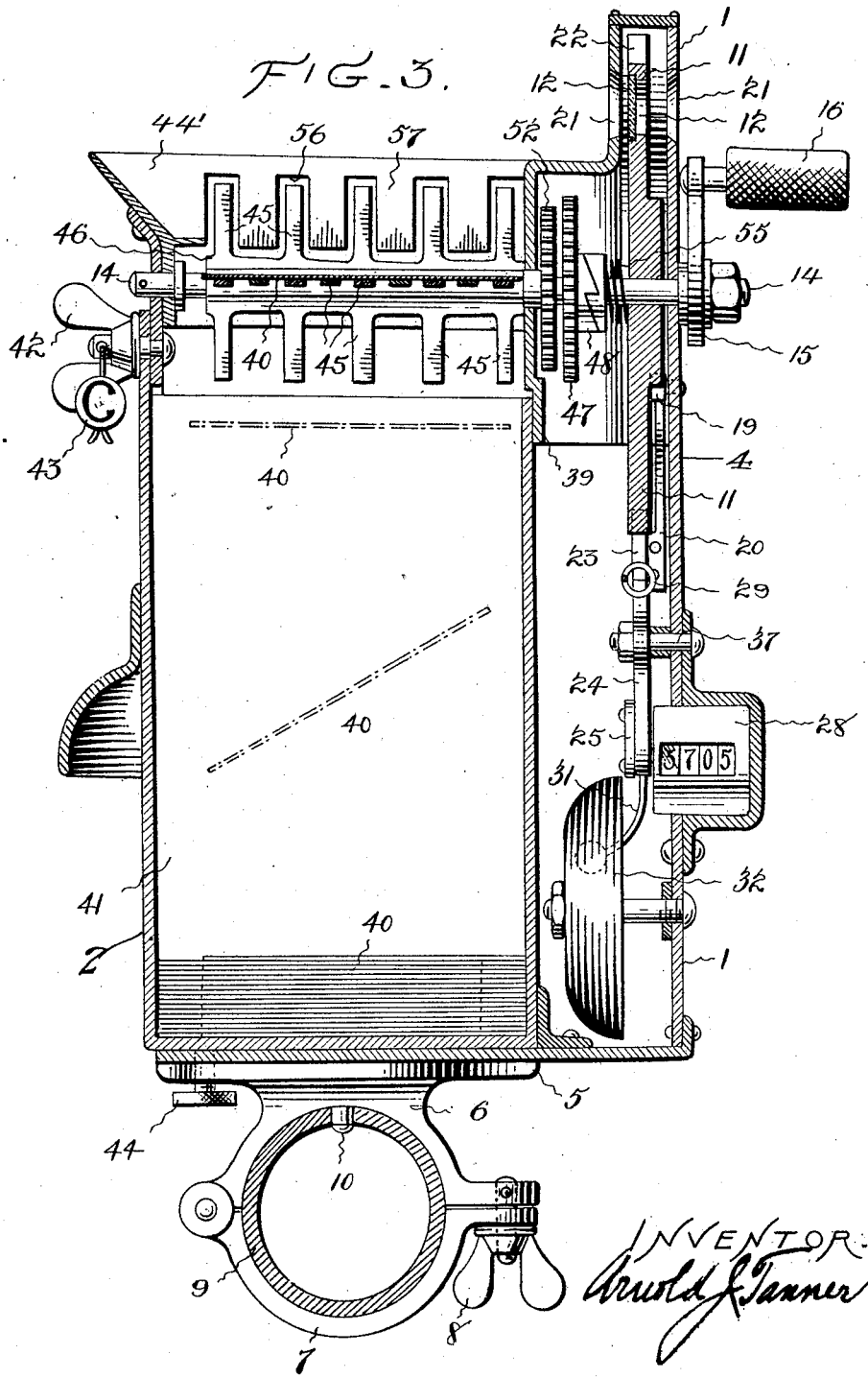

ARNOLD J. TANNER, OF NORTH HAVEN, CONNECTICUT, ASSIGNOR TO JOHNSON FARE BOX COMPANY, OF CHICAGO, ILLINOIS, A CORPORATION OF NEW YORK.

TICKET OR FARE BOX.

1,413,632.  Specification of Letters Patent.  Patented Apr. 25, 1922.

Application filed August 27, 1919. Serial No. 320,102.

*To all whom it may concern:*

Be it known that I, ARNOLD J. TANNER, a citizen of the United States, and resident of North Haven, in the county of New Haven and State of Connecticut, have invented certain new and useful Improvements in Ticket or Fare Boxes, of which the following is a specification.

This invention relates to ticket or fare boxes especially serviceable on passenger vehicles for receiving fare tickets or the like.

An object of the invention, amongst other things, is to produce an efficient apparatus, compact and simple in construction and easily operated, by sense of feeling alone if necessary and which apparatus is particularly adaptable for use with the collection of multiple fares or fares of different value.

The improved apparatus is employed with the best advantage in connection with prepayment and post-payment stage or zone fare systems. In both instances it is customary to deliver a ticket to the passenger indicating the fare paid or to be paid to one or more fare points and when the passenger reaches his destination the ticket is given up for checking. In a prepayment system, if the passenger travels beyond the point to which the fare was paid, an excess fare must be paid. In a post-payment system, the passenger is required to pay the entire fare when he reaches his destination, and the amount of which fare is determined by indicating matter printed on the ticket. With both fare systems the operator, usually the conductor of the vehicle, is required to carefully check the ticket and receive the prescribed post-payment fare or an excess to a previously paid fare. It is essential a record should be kept of all fare payments and also it is desirable, indication of proper recording should be given.

According to this invention, the apparatus is provided with means whereby a ticket deposited in the box, may readily be inspected by the conductor to ascertain the amount of the fare payable. The passenger having paid the amount of the assessed fare, the recording and indicating mechanism of the ticket box, is then operated by manipulation of one common operating means, to simultaneously record the fare paid, give both an audible and visual indication corresponding to the amount of the fare recorded and during the operating movement of said means or during the return movement thereof, the ticket is conveyed from a receiving or display receptacle into an enclosed retaining receptacle.

Illustrative embodiments of the invention will be described hereinafter with reference to the accompanying drawings in which—

Figure 1 is a rear elevation of one form of the improved box with the back plate thereof partly broken away, Figure 2 is a plan view illustrating a ticket box having a slightly modified construction;

Figure 3 is a vertical section taken on line 3—3 of Figure 1, looking in direction of the arrow;

Figure 4 is a detail view of an indicating member of the apparatus;

Figure 5 is a detail view showing a modified form of the rotating conveyor through which tickets are deposited into the ticket retaining receptacle of the box, and Figure 6 shows a specimen ticket.

Referring more particularly to Figure 1, the casing 1 is composed of two parts, of which the front section 2 is secured by screws 3 to the rear section 4. Both sections are secured to base plate 5 which by means of a plumber block 6, having a hinged section 7, and tightening nut 8, offer convenient means for detachably securing the ticket box on a rail, such as 9. This fastening device provides means for readily changing the location of the box and to facilitate positioning the box, also to prevent the box from turning on its support, the pin 10 is provided on the block 6 to engage elongated slot 11 in the rail.

The rear section 4 contains the recording and indicating mechanism, comprising disk or index dial 11 having thereon a series of designating characters, representing fare values, starting at zero, progressively increasing by value, as many in number and arranged according to requirement. For example, there may be five characters, representing zero and four different fare values. Preferably the characters are on translucent disks 12 composed of celluloid for example and inserted in openings 13 in the disk 11, whereby illumination of the indicating characters is possible, and the characters are readable from the back as well as the front.

The disk 11 is partially rotated on the shaft 14 by means of external crank 15 and handle 16 to an extent determined by the amount of the fare to be registered and indicated. A detent wheel 17 rotating with the disk 11, guides intermittent selective operation of said crank. Said detent wheel has a series of notches 18, alternately engaging detent 19 and which detent is kept in engagement with said detent wheel by means of a suitable spring such as 20.

The disk 11 is rotated intermittently by turning the crank 15 in the direction of arrow *a*. Turning of the crank 15 rotates the shaft 14 and with the latter, the disk 11 is turned to a selected position. Engagement of the detent 19 in notches 18, as stated guides or checks the rotating movement and by sense of feeling alone, the operator may stop the rotation in any determined position so as to bring the selected character in registration with the inspection opening 21, of which there is one in both the front and back of the casing.

The disk 11 has secured thereto a series of lugs 22 projecting radially from the edge of the disk and each of these lugs has its respective relation with two of the characters on the disks, for example, the lug 22 shown in engagement with the dog 23 on pivoted lever 24, serves as an additional stop for locating the character 0 in a visible position and the same lug, when the crank 15 is turned, tilts the lever 24, transmitting motion through link 25 to arm 26, whereby shaft 27 of the counter 28 is partially rotated to effect one count. Rotation of the crank is continued until the respective or first notch 18 of the detent wheel 17 is engaged by detent 19. During this continued rotation the engaged lug 22 will be moved out of engagement with the dog 23 and spring 29 will throw the lever back to its normal position against stop 30 with a quick action, effecting a sharp blow of the clapper 31 against bell 30. The engagement of the first notch 18 brings the character representing a six cent fare into view. It will then follow by the operation described, one count representing payment of one fare is registered and a corresponding visual and a single audible indication of the payment is given. When twelve cents, representing a two stage fare is paid, the disk 11 is turned so that the characters representing a twelve cent fare, is brought into view and in doing this, the lever 24 is operated twice to effect recording of two counts and ringing of the bell twice. And so on for the maximum fare value, twenty four cents, four counts are recorded and the bell is rung four times. It may be necessary that the lever 24 should be given a greater throw than that required for turning the arm 26 of the counter, and such greater throw may be given without interfering with the recording means, by limiting the movement of said arm 26 through engagement of the same with stop pin 33 and providing a connection for the link 25 with the arm 26 so as to allow lost motion.

It is desirable the operator should permit a slight dwell to occur in the operation to enable the passenger to read the indication brought to view. Then the operator, by a reverse movement, brings the disk 11 back into position so that the character 0 is again visible. In this reverse operation the movement of the disk is stopped by engagement of the lug 34 with the stop 35. The same means, it will be noted, prevents reverse or clockwise movement of the disk when the character 0 is in view, and also in conjunction with lock 36, the entire mechanism of the ticket box may be locked against unauthorized operation.

The dog 23 is pivoted on pin 37 whereon the said dog is moved against spring 38 so as not to obstruct the reverse movement of the disk 11. This reverse or return movement is effected by turning the handle in a clockwise direction but obviously this return movement may be effected automatically by means of a volute spring for example.

Referring now to Figure 3, herein the construction is practically the same as the construction above described only the casing is composed of one section with a division plate 39 therein. In this figure the means for depositing a ticket 40 into the drawer or retaining receptacle 41 are clearly shown. This receptacle is preferably locked in its closed position by means of winged nut 42 and seal 43 which provides a locking device safe from tampering. Tightening screw 44 is employed to prevent rattling of the drawer.

The means for depositing the ticket into the box comprises an inspection or display receptacle or well 44′ preferably having an inclined open end and top to permit easy placing of the ticket therein by the passenger, if desired, and inspection thereof by the conductor. The ticket, in its position for inspection, rests on a series of fingers 45 of two members 46 of a conveyor, which members are rotated synchronously by means of intermediate gearing driven by gear wheel 47 through clutch 48 on shaft 14. One of the conveyor members 46 is loosely mounted on shaft 14 and the other conveyor member rotates with shaft 49 (see Fig. 2). Gear wheel 47 meshes with gear 50 on shaft 49, which gear 50 in turn rotates gear 51 also on shaft 49. Gear 51 meshes with gear 52, secured to the conveyor member 46 rotating on shaft 14, and by means of these gears both conveyor members 46 are rotated synchronously but in opposite directions. The ratio of the gearing is in conformity with the number of intermittent stops on the disk 11, for instance, in one instance shown herein, there are five stops and in another instance there are six stops; therefore, since the conveyor members 46 are required to make only a quarter of a complete turn to bring the fingers 45 in their proper relative position at each stopping point of the disk 11, the ratio of the gearing must necessarily be 5 to 4, 6 to 4, or as the case may be. Obviously if there are only 4 stops the rotating conveyor members can be operated directly without the intermediate gearing. In one direction of movement of the crank 15, the clutch 48 is released and to ensure the release, a drag is placed on one of the rotating members 46, by means of friction wheel 53 and engaging spring 54. Clutch 48, it will be seen, is thrown into an engaging position by spring 55.

The fingers 45 of the conveyor members radiate at right angles, when the members are at rest with the fingers immediately over the receptacle lying in a horizontal position. The ticket rests on these latter fingers and when the members 46 are moved a quarter of a turn in opposite directions the next set of fingers of each member move through openings 56 in side walls 57 of the receiving receptacle or well 44, over the ticket, thus positively conveying or transporting the ticket into the retaining receptacle 41. As represented in broken lines, the tickets will fall fairly flat ways so as to pack better in the receptacle 41, but should the tickets pile up improperly, the rotating fingers will force the pile down without picking up any of the tickets. It will be noted the tickets are kept in precisely the same order as they are deposited in the box thus providing additional means for checking.

In Figure 4 the disk is shown as arranged to register and indicate fares in accordance with the scale of fare charged as represented by the ticket shown in Figure 2. Herein there are five stage fares, of value denominations, three, five, seven, nine and eleven cents. Movement of the crank 15 from its normal or zero position, will first register two counts, representing cents in value, by two operations of the lever 24 through successive engagement with two short lugs 22 and the third count, to register the full amount of the first or three cent fare is effected with the ringing of the bell 32 by operation of the lever 24, through engagement with the lug 22′ which is of greater length than lugs 22 so as to give sufficient motion to lever 24 to cause ringing of the bell. With each engagement of a lug 22′, the bell is rung; therefore, if the maximum value eleven cents is indicated, the bell will ring five times and the value eleven cents will be recorded by the counter.

In Figure 4, it will be noted, the detent 19 is differently positioned and the tooth thereof is perpendicular on one side, engaging a particular and corresponding notch in the wheel 17, and this engagement holds the disk in the zero position, permitting initial movement of the crank 15, only in the direction of the arrow 6.

In Figure 5 a modified form of rotating conveyor members 46 is shown in which instead of interlying fingers, continuous webs 58 are employed. This construction has the advantage that the ends of a ticket cannot be thrust into a space such as might be left between the interlying fingers of the other construction.

Among other advantages, the fare box hereinbefore described is especially suitable for the deposit therein of tickets composed of comparatively thin paper, such as delivered by a portable stage fare ticket printing and issuing machine. These tickets being somewhat flimsy, and often limp owing to dampness, they have a tendency at times to stick and clog a chute or passage, if they are caused to fall by means of gravitation alone, but with the improved positively acting conveying means, even if the tickets are damp and crumpled, the positive action of the conveyor will force the tickets directly from the display receptacle into the deposit receptacle without passing under effect of gravity, through an intervening space where stoppage might occur, particularly if the tickets are of a comparatively large size, such as would be used in a service having many fare points. The improved box may also be readily adapted for service where any number of fare values, within a reasonable limit, are charged, by simply changing the index dial and the co-operating means for giving motion to the members of the conveyor. For example, if the box is designed to take care of a service having say ten stage fares, the machine as illustrated would be applicable only the indexes on the index dial would appear at closer intervals. And if as many as fifteen fare points are to be taken care of, naturally the tickets would be of a larger size and consequently the size of the box, and the index dial, would be increased to conform, but all the other mechanism, excepting the alarm device, would be precisely the same for a fifteen stage service as for one having four stages. Neither duplication nor complication of parts enters, so under all reasonable conditions the improved box is serviceable and simplicity of construction and operation is always maintained.

Modifications in the details of construction and arrangement, or change in the mode of application of the means herebefore described and illustrated in the drawings, may readily be conceived and carried out and it is to be understood all modifications or changes coming fairly within the terms of the appended claims, shall be covered thereby.

I claim—

1. A registering multiple or stage fare deposit box having co-relatively associated mechanism for indicating and registering fares of varying amounts and conveying tickets or the like, means comprising an operating handle capable of selective operation for effecting simultaneous operation of said mechanism, a part of said mechanism for indicating fares comprising a rotatable dial directly operatable by said operating handle, means permitting rotation in one direction only of said dial from the zero point and means whereby a selected indication on said dial is brought to a determined position and exposed to view.

2. A registering multiple fare deposit box having co-relatively associated mechanism for indicating and registering fares of varying amounts and conveying tickets or the like, means comprising an operating handle capable of selective operation for effecting simultaneous operation of said mechanism, a part of said mechanism for indicating fares comprising a rotatable dial directly operatable by said operating handle, means permitting rotation in one direction only of said dial from the zero point and means whereby a selected indication on said dial is brought to a determined position and exposed to view, and another part of said mechanism for registering fares comprising a counting device which is operatively connected with said dial whereby registration is effected corresponding with the indication displayed by said dial.

3. A registering multiple or stage fare deposit box having co-relatively associated mechanism for the indicating and registering fares for varying amounts and conveying tickets or the like, means comprising an operating handle capable of selective operation for effecting simultaneous operation of said mechanism, a part of said mechanism for indicating fares comprising a rotatable dial directly operatable by said operating handle, means permitting rotation in one direction only of said dial from the zero point and means whereby a selected indication on said dial is brought to a determined position and exposed to view, another part of said mechanism for registering fares comprising a counting device which is operatively connected with said dial whereby registration is effected corresponding with the indication shown by said dial and a third part of said mechanism consisting of the ticket conveyer operatable with said dial through the medium of gearing driven by a shaft on which said dial and operating handle are mounted.

4. In a ticket or fare box, a display receptacle; a deposit receptacle; a conveyor acting to positively convey contents of said display receptacle into said deposit receptacle; registering means for fares of various value denominations co-operatively associated with said conveyor and determinably operatable by a single actuating means.

5. In a ticket or fare box, a display receptacle; a deposit receptacle; a conveyor positively conveying contents of said display receptacle into said deposit receptacle; and registering and indicating means for fares of various value denominations co-operatively associated with said conveyor and determinably operatable by a single actuating means to register and indicate a selected fare value.

6. In a ticket box, a display receptacle; a deposit receptacle; a conveyor positively transporting a ticket from said display receptacle into said deposit receptacle; means for registering and indicating, both visually and audibly, fares of different value; and said means being co-operative with said conveyor and determinably operatable by a single actuating means to register and indicate a fare of a given value.

7. In a multiple fare deposit box, a positively acting fare conveyor having a pair of members rotatable in opposite directions; a fare registering and indicating member correlatively connected with said conveyor and movable into determined angular positions with relation to respective fare values and means whereby each determined operation of said member effects an operative movement of said conveyor.

8. In a ticket deposit box, a display receptacle; a deposit receptacle and means comprising a pair of members, each member having a series of radial fingers or projections meshing with each other and turning in opposite directions for positively engaging and conveying a ticket from said display receptacle into said deposit receptacle.

9. In a fare or ticket box, a positively acting conveyor comprising a pair of members turning in opposite directions and each member having intermeshing radial projections; registering and indicating mechanism; and means for effecting correlative movement of said conveyor and said mechanism.

10. In a fare or ticket box, a positively acting conveyor; an index dial; a shaft imparting direct motion to said dial in both directions of movement, and in one direction of movement only said shaft indirectly imparting motion to said conveyor through a clutch and gearing.

11. In a multiple fare registering deposit box, a rotatable fare conveyor; a fare register; a fare register operating member having thereon a plurality of lugs singly or successively acting on said register according to the respective fare to be registered; and means for effecting operation in unison of said conveyor and said register operating member.

12. In a multiple fare deposit box, an indicating dial having thereon a plurality of lugs located in determined radial positions; an operating lever singly engaged by one or successively engaged by more of said lugs according to the respective fare value to be registered, and a fare register operated by said operating lever.

13. A fare registering deposit box having a fare conveyor; an index dial co-operative with said conveyor; a plurality of lugs projecting from the periphery of said dial; an operating lever singly or successively engaged and operated by said lug in accordance with selective operation of said dial; a fare register operated by said lever to register each operation thereof; and an audible signalling device actuated by each or alternate operations of said lever.

14. In a fare or ticket box having a co-operative fare conveying and indicating means; a driving shaft; a driven shaft; an index dial mounted on and turning with said driving shaft; and a pair of co-acting conveyor members rotating in opposite directions and deriving motion from both of said shafts.

15. In a ticket box having correlative conveying and indicating means; a casing having a display receptacle; a conveyor having oppositely rotating members constituting the bottom of said receptacle; a retaining receptacle; mechanism comprising a shaft for operating said conveyor members to effect positive transportation of a ticket thereon into said retaining receptacle; an indicating dial turning with said shaft; and means whereby said shaft is turned to correspondingly turn the indicating dial to indicate a selected fare value.

Signed at North Haven in the county of New Haven and State of Connecticut this 26th day of August A. D. 1919.

ARNOLD J. TANNER.